United States Patent
Mayor et al.

(10) Patent No.: US 9,820,093 B2
(45) Date of Patent: Nov. 14, 2017

(54) PROGRAMMABLE BEACON PAYLOADS

(71) Applicant: Apple Inc., Cupertino, CA (US)

(72) Inventors: Robert Mayor, Half Moon Bay, CA (US); Pejman Lotfali Kazemi, Sunnyvale, CA (US); Augustin Prats, San Francisco, CA (US); Brian J. Tucker, Sunnyvale, CA (US); Joakim Linde, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/501,611

(22) Filed: Sep. 30, 2014

(65) Prior Publication Data

US 2015/0181384 A1 Jun. 25, 2015

Related U.S. Application Data

(60) Provisional application No. 61/919,592, filed on Dec. 20, 2013.

(51) Int. Cl.
*H04W 4/02* (2009.01)
*H04W 24/02* (2009.01)
*H04W 48/12* (2009.01)

(52) U.S. Cl.
CPC .......... *H04W 4/021* (2013.01); *H04W 24/02* (2013.01); *H04W 48/12* (2013.01)

(58) Field of Classification Search
CPC ...... H04W 4/021; H04W 24/02; H04W 48/12
See application file for complete search history.

(56) References Cited

U.S. PATENT DOCUMENTS

| | | |
|---|---|---|
| 7,397,424 B2 | 7/2008 | Houri |
| 7,856,234 B2 | 12/2010 | Alizadeh-Shabdiz et al. |
| 7,899,583 B2 | 3/2011 | Mendelson |
| 7,924,149 B2 | 4/2011 | Mendelson |
| 8,054,219 B2 | 11/2011 | Alizadeh-Shabdiz |
| 8,223,074 B2 | 7/2012 | Alizadeh-Shabdiz |
| 8,369,264 B2 | 2/2013 | Brachet et al. |
| 8,478,297 B2 | 7/2013 | Morgan et al. |
| 8,836,580 B2 | 9/2014 | Mendelson |
| 8,866,673 B2 | 10/2014 | Mendelson |
| 8,896,485 B2 | 11/2014 | Mendelson |
| 8,941,485 B1 | 1/2015 | Mendelson |
| 8,983,493 B2 | 3/2015 | Brachet et al. |

(Continued)

*Primary Examiner* — Brandon Miller
(74) *Attorney, Agent, or Firm* — Fish & Richardson P.C.

(57) ABSTRACT

In some implementations, a beaconing protocol can be used to broadcast beacon information to mobile devices. The beaconing protocol can be used by a Bluetooth Low Energy (LE) (e.g., Bluetooth 4.0) beacon to transmit a package of information that identifies the beacon and indicates the calibrated transmission power (e.g., measured power) of the beacon. The package of information can be configured by beacon providers and/or beacon installers at the locations where the beacons are installed. When a mobile device receives the beacon package, the mobile device can use the beacon identification information and/or the measured power of the beacon to determine a location (e.g., precise location, geofence location) of the mobile device. In some implementations, the mobile device can transmit the beacon information to a server and the server can determine the location of the mobile device and send location and/or content information back to the mobile device.

18 Claims, 8 Drawing Sheets

(56) References Cited

U.S. PATENT DOCUMENTS

| | | |
|---|---|---|
| 9,020,687 B2 | 4/2015 | Mendelson |
| 9,204,251 B1 | 12/2015 | Mendelson |
| 9,204,257 B1 | 12/2015 | Mendelson |
| 9,361,630 B1* | 6/2016 | Goswami ............ G06Q 30/0267 |
| 2009/0286548 A1* | 11/2009 | Coronel .................. H04W 4/20 |
| | | 455/456.1 |
| 2011/0124286 A1* | 5/2011 | Tanaka et al. ................ 455/41.1 |
| 2012/0064855 A1 | 3/2012 | Mendelson |
| 2013/0028107 A1* | 1/2013 | Ho ........................ H04W 24/02 |
| | | 370/252 |
| 2013/0260797 A1* | 10/2013 | Jones ...................... H04W 4/02 |
| | | 455/456.3 |
| 2013/0273938 A1* | 10/2013 | Ng ........................ H04W 64/00 |
| | | 455/456.1 |
| 2013/0295954 A1* | 11/2013 | Hamalainen .......... G01S 5/0289 |
| | | 455/456.1 |
| 2014/0113612 A1* | 4/2014 | Shu ........................ H04W 48/14 |
| | | 455/418 |
| 2014/0253383 A1* | 9/2014 | Rowitch .................. G01S 1/02 |
| | | 342/386 |
| 2014/0364056 A1* | 12/2014 | Belk et al. .................... 455/41.1 |
| 2015/0119071 A1* | 4/2015 | Basha .................. H04W 64/00 |
| | | 455/456.1 |

\* cited by examiner

| Byte(s) | Name | Value |
|---|---|---|
| 0 | Flags[0] | [BT 4.0] |
| 1 | Flags[1] | [BT 4.0] |
| 2 | Flags[2] | [BT 4.0] |
| 3 | Length | [BT 4.0] |
| 4 | Type | [BT 4.0] |
| 5-6 | Company ID | 0x004C |
| 7-8 | Beacon Type | 0x0215 |
| 9-24 | Proximity UUID | 0xnn...nn |
| 25-26 | Major | 0xnnnn |
| 27-28 | Minor | 0xnnnn |
| 29 | Measured Power | 0xnn |

FIG. 2

PROGRAMMABLE BEACON PAYLOADS

CROSS-REFERENCE TO RELATED APPLICATIONS

This application claims priority to U.S. Provisional Patent Application No. 61/919,592, entitled "Programmable Beacon Payloads," filed Dec. 20, 2013, the entire contents of which is incorporated herein by reference.

TECHNICAL FIELD

The disclosure generally relates to location based services.

BACKGROUND

Wireless transmitters can be configured to transmit information that can be used to determine a location of a mobile device and provide content to a mobile device based on the mobile device's location. For example, GPS, Wi-Fi, and cellular transmitters all provide information that can be used to determine the location of a mobile device. Known locations of wireless transmitters and distances between the wireless transmitters and a mobile device (e.g., derived from signal strength) can be used to perform trilateration to determine a specific location of the mobile device. Geofencing based on the location and transmission range of one or more wireless transmitters can be used to determine when a mobile device enters or exits a geofenced area.

SUMMARY

In some implementations, a beaconing protocol can be used to broadcast beacon information to mobile devices. The beaconing protocol can be used by a radio frequency beacon (e.g., Bluetooth Low Energy (LE) beacon) to transmit a package of information that identifies the beacon and indicates the calibrated transmission power (e.g., measured power) of the beacon. The package of information can be configured by beacon providers and/or beacon installers at the locations where the beacons are installed. When a mobile device receives the beacon package, the mobile device can use the beacon identification information and/or the measured power of the beacon to determine a location (e.g., precise location, geofence location) of the mobile device. In some implementations, the mobile device can transmit the beacon information to a server and the server can determine the location of the mobile device and send location and/or content information back to the mobile device.

Particular implementations provide at least the following advantages: The Bluetooth LE beacon payload can be easily programmed by beacon providers and/or installers. The beacon payload can be programmed to indicate an area and/or sub-areas where the beacons are installed. The beacon payload can be programmed beacon power measurements so that a receiving mobile device can more accurately determine a distance between the mobile device and the broadcasting beacon.

Details of one or more implementations are set forth in the accompanying drawings and the description below. Other features, aspects, and potential advantages will be apparent from the description and drawings, and from the claims.

DESCRIPTION OF DRAWINGS

FIG. 2 illustrates an example beacon packet that includes a beacon payload that conforms to a beacon protocol.

Like reference symbols in the various drawings indicate like elements.

DETAILED DESCRIPTION

Overview

Figure 1:
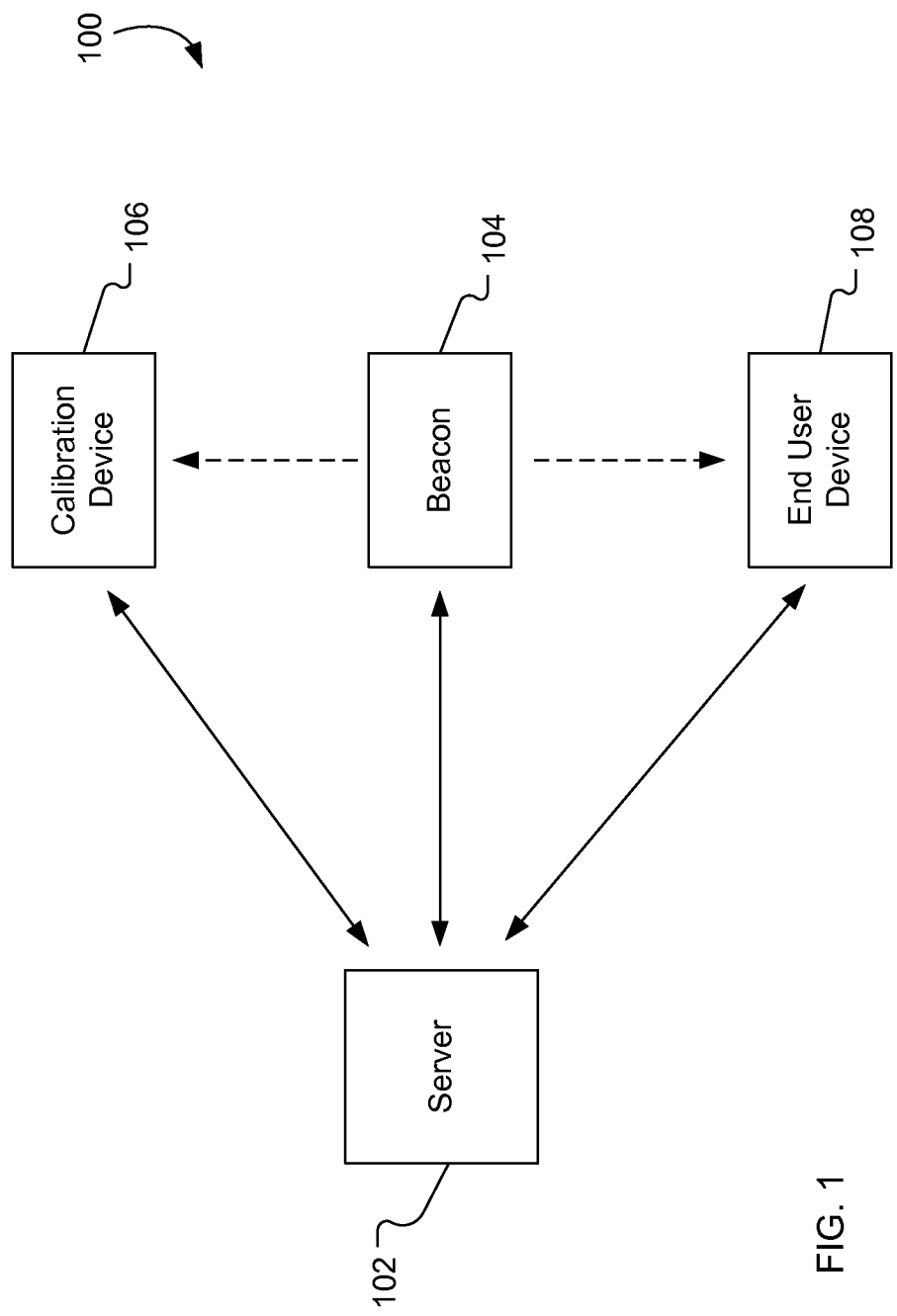
FIG. 1 illustrates an example beaconing system.

FIG. 1 illustrates an example beaconing system 100. For example, the beaconing system 100 can include server 102 and beacon device 104. In some implementations, beacon device 104 can be a Bluetooth LE beacon (e.g., a mobile device, phone, tablet, etc., configured with a Bluetooth LE wireless transceiver) configured to transmit a beacon payload that conforms to a beacon protocol. The server 102 can communicate with beacon device 104 to configure the beacon payload with data appropriate for a particular beacon installation or beacon deployment. For example, a user can provide input to the server 102 to specify a beacon payload including a beacon type, beacon identifiers and measured power for beacon device 104. The beacon device 104 can also be configured to transmit according to a user-specified time interval and using a user-specified transmission power. Once configured, beacon device 104 can broadcast the beacon package according to the time interval and transmission power. For example, the beacon device 104 can broadcast the beacon package every second, every two seconds, etc.

In some implementations, the signal strength (e.g., broadcast power) of beacon device 104 can be measured by calibration device 106. For example, the signal strength can be measured before or upon the deployment or installation of beacon device 104 at a location (e.g., a store, restaurant, business, etc.). For example, beacon device 104 can initially broadcast a beacon payload that includes a null value or default value for the measured power value until the power of the beacon has been measured. Calibration device 106 (e.g., a mobile device, smart phone, tablet computer, etc., having a Bluetooth LE transceiver) can be placed near (e.g., one meter from) beacon device 104. Calibration device 106 can sample Bluetooth LE signals from the beacon device 104 over a period of time (e.g., 10 seconds), determine the beacon signal strength for each sample, and average the sample signal strengths. The average signal strength can then be transmitted from calibration device 106 to server 102. Server 102 can reconfigure or program the beacon 104 so that the beacon device 104 includes the average signal strength (i.e., measured power) in the beacon payloads subsequently broadcast by beacon device 104.

In some implementations, system 100 can include an end user device 108 that is configured to receive Bluetooth LE (e.g., Bluetooth 4.0) signals and process the beacon payload. For example, end user device 108 can be a mobile device, smart phone, tablet computer or other device configured to receive and process Bluetooth LE/beacon protocol signals.

Once the end user device 108 enters within the broadcast range of beacon device 104, end user device 108 can receive the broadcast signal, including the beacon payload, from beacon device 104. End user device 108 can extract the beacon identifiers and the measured power value from the beacon payload and measure the received signal strength of the signal from beacon device 104. The end user device 108 can then determine the distance between the end user device 108 and the beacon device 104 based on the received signal strength detected by end user device 108 and based on the measured power value received in the beacon payload. For example, the measured power value can be used to calibrate a distance function that uses received signal strength to estimate the distance between the beacon device 104 and the end user device 108. The distance function can be based on a path loss model that uses an exponential decay curve that is calibrated based on the measured power value. The exponential decay curve can be a distance/power curve that is calibrated to a measured power value at one meter distance, for example. Thus, the exponential decay curve can be calibrated to provide more accurate distance estimates based on the measured power and received signal strength for the transmitting beacon. The end user device 108 can then use the calibrated exponential decay curve to estimate the relative distance (e.g., immediate: within 10 cm, near: 1-4 m, far: greater than 4 m, unknown) to the beacon device 104 and/or estimate the actual distance (e.g., meters, feet, inches, etc.) between the end user device 108 and the beacon device 104 based on the received signal strength of the signal from the transmitting beacon.

In some implementations, the end user device 108 can transmit the beacon identification information and/or the distance information (e.g., relative distance, actual distance) to server 102. For example, when end user device 108 sends the beacon identification information to server 102, the server 102 can determine that the end user device 108 has entered into a geofenced area defined by the identified beacon. When end user device 108 sends identification information and distance information to server 102, server 102 can use the known location of the identified beacon and the distance between the beacon device 104 and end user device 108 to estimate a location of the end user device 108. For example, if the end user device 108 sends identification and distance information for three beacons, server 102 can perform trilateration using the known locations of the identified beacons and the distances between the end user device 108 and each beacon to estimate a precise location of the end user device 108. For example, the server 102 can be configured with the locations of each beacon.

In some implementations, server 102 can transmit content and/or location information to end user device 108 based on the beacon identification and distance information. For example, if server 102 determines that end user device 108 has entered a geofence associated with a beacon identifier, the server 102 can send content (e.g., advertising) associated with the geofence to end user device 108. If server 102 estimates a precise location of the end user device 108, then server 102 can transmit the estimated location to the end user device 108.

FIG. 2 illustrates an example beacon packet 200 that includes a beacon payload that conforms to the beacon protocol mentioned above. For example, the beacon payload can be transmitted in a Bluetooth LE (e.g., Bluetooth 4.0) packet that conforms to the Bluetooth 4.0 Core Specification, Volume 3. In some implementations, the first five bytes (202-210) of the packet 200 include data defined by the Bluetooth 4.0 Core Specification, Volume 3, Appendix C, Section 18.1. For example, the first five bytes can include flags[0], flags[1], flags[2], length and type information defined by section 18.1. In some implementations, the first five bytes (202-210) of the packet include data defined by the Bluetooth 4.0 Core Specification, Volume 3, Appendix C, Section 11. For example, the first five bytes (202-210) can include a length field specifying the length of the packet, a type field, flags field, length field and type field defined by Section 11.

In some implementations, bytes 5-6 (214) of packet 200 can include an identifier for the company specifying the beacon payload and/or beacon protocol. For example, bytes 5-6 can store a hexadecimal identifier (0x004C) that identifies Apple Inc. Bytes 7-8 (216) can include a beacon type identifier. For example, bytes 7-8 can store a hexadecimal identifier 0x0215 that indicates that the beacon transmitting the beacon payload is a proximity beacon that comports with the beacon protocol described herein.

In some implementations, bytes 9-24 (218) can store a universally unique identifier (UUID) that identifies the beacon transmitting the beacon payload. For example, the universally unique identifier for the beacon can be unique to the beacon or the UUID can be unique to all beacons associated with a particular store, company, restaurant, etc. The UUID can be used to identify a store, for example, such that when a mobile device receives a beacon payload with a particular UUID, the UUID can be used to determine what store, building, etc., that the mobile device is in. For example, the UUID can be associated with a particular location. The UUID can be associated with a business regardless of location (e.g., all Starbucks coffee shops can use the same UUID).

In some implementations, bytes 25-26 (major 220) can be used to further identify the broadcasting beacon. For example, if the UUID (218) is used to identify all Starbucks coffee shops, then major 220 can be used to store a hexadecimal value that identifies a particular Starbucks store. Similarly, bytes 27-28 (minor 222) can be used to further identify the broadcasting beacon. For example, if the UUID identifies all Starbucks coffee shops and major 220 identifies a particular store, then minor 222 can store a hexadecimal number that identifies a particular location within the particular Starbucks store. Thus, the UUID 218, major 220 and minor 222 can be used to identify the broadcasting beacon at multiple levels of detail, as described further below. For example, the UUID 218, major 220 and minor 222 values can specify a "family" (UUID 218), "genus" (major 220), "species" (minor 222) type relationship for identifying beacons.

In some implementations, packet 200 can include a measured power value at byte 29 (224). For example, the measured power value can be an empirically determined value as described above with reference to FIG. 1 and calibration device 106 and with reference to FIG. 7 below.

Figure 3:
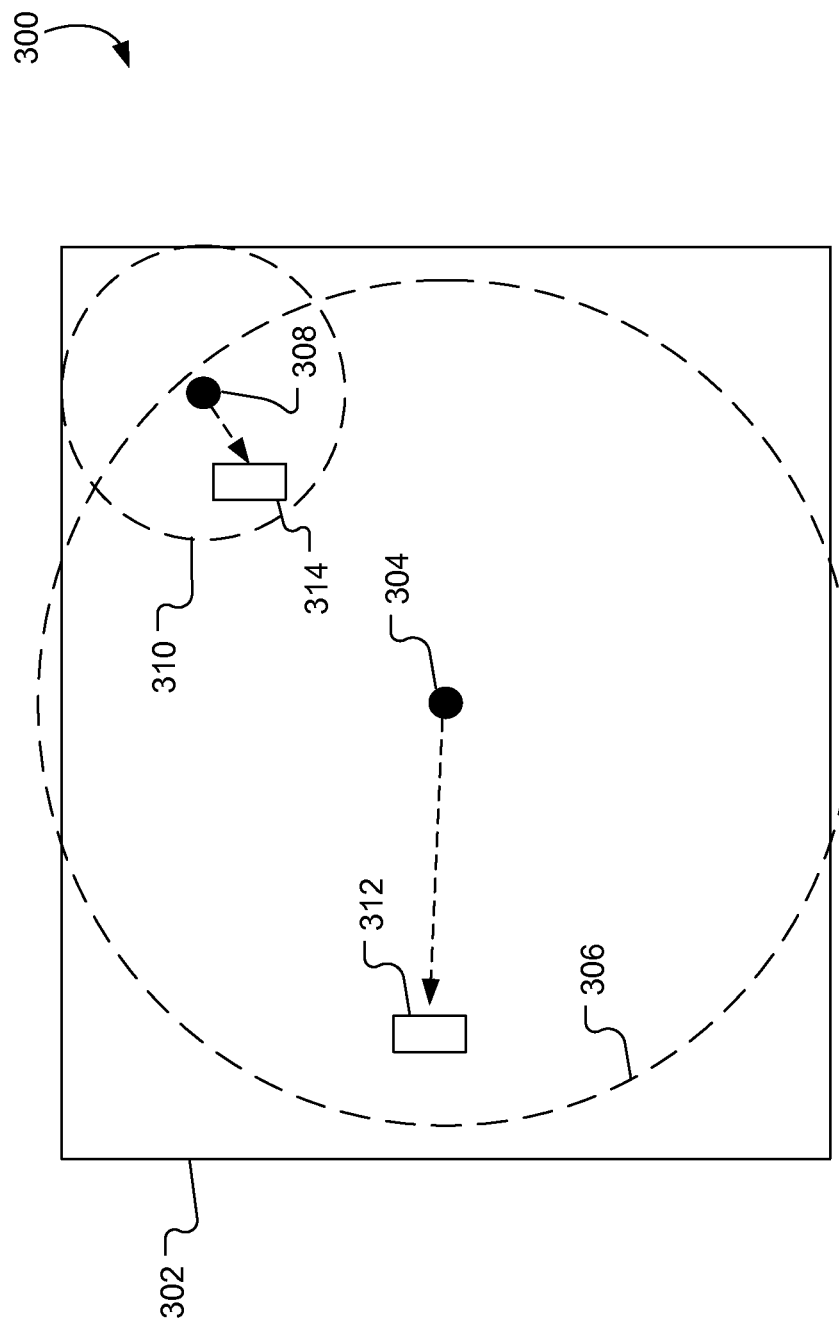
FIG. 3 is a drawing illustrating geofencing using Bluetooth LE beacons that conform to the beacon protocol.

FIG. 3 is a drawing 300 illustrating geofencing using Bluetooth LE beacons that conform to the beacon protocol described herein. For example, drawing 300 includes a building 302 having Bluetooth LE beacons 304 and 308. Beacon device 304 can be configured to broadcast a beacon payload using a broadcast power resulting in a broadcast area defined by circle 306. Beacon device 308 can be configured to broadcast a beacon payload using a broadcast power resulting in a broadcast area defined by circle 310. Thus, beacon device 304 can be configured to broadcast using a broadcast power that is greater than beacon 308.

In some implementations, beacon devices 304 and 308 can be associated with the same UUID. For example, because beacon devices 304 and 308 are within the same building, company, store, restaurant, etc., beacon devices 304 and 308 can broadcast the same UUID that identifies the business using the beacons. However, since the beacon devices 304 and 308 have different broadcast areas and/or locations within the building 302, beacon devices 304 and 308 can be configured with different major and minor values, as described above. For example, when mobile device 312 enters the broadcast area 306 of beacon device 304, mobile device 312 can receive a beacon payload that includes the UUID associated with the building 302 (e.g., store, restaurant, company, etc.) and major and minor values associated with a particular area of the building that beacon 304 covers. The mobile device 312 can transmit an identifier associated with the mobile device or the user of the mobile device, the UUID, major and minor values back to a beacon server (e.g., server 102 of FIG. 1) and the beacon server can process the device/user identifier, UUID, major and minor values. For example, the beacon server can initiate some action in response to determining that the mobile device (or user) has entered into a geofence associated with beacon device 304 (e.g., notify an employee to retrieve a package for the user who just entered the store). The beacon server can transmit advertising to the mobile device 312 when the beacon server determines that the mobile device 312 has entered the geofence associated with beacon device 304.

In some implementations, beacon device 308 can be used to determine when a user (mobile device) has entered a particular area of the building 302. For example, because the broadcast area of beacon device 308 covers a small portion of the building 302, the actions performed and/or the content provided to mobile device 314 can be targeted to the particular area of the building 302 covered by beacon device 308. For example, if beacon device 308 covers a sporting goods section of a store within building 302 and mobile device 314 enters the geofence (e.g., area defined by circle 310) associated with beacon device 308, the mobile device 314 can receive UUID, major and minor beacon payload information that identifies beacon device 308, transmit the UUID, major and minor information to the beacon server, and the beacon server can use the UUID, major and minor information to determine that the mobile device 314 has entered into the sporting goods section of building 302. The server can then transmit targeted advertising or perform some other action specific to the sporting goods section of building 302.

In some implementations, a determination that a mobile device is within a geofence associated with a Bluetooth LE beacon is based on whether the mobile device has received a signal from a Bluetooth LE beacon. For example, if the mobile device receives a payload from a Bluetooth LE beacon, the mobile device is within the geofence associated with the beacon. If the mobile device is not receiving a beacon payload from Bluetooth LE beacon, the mobile device is not within a geofence associated with the beacon.

In some implementations, a determination that the mobile device is within a geofence associated with a Bluetooth LE beacon can be based on signal strength. For example, if the mobile device is on the border of a geofence, the reception of the beacon's broadcast may be spotty. To prevent inconsistent behavior on a geofence border, a mobile device can report a received signal or a beacon payload to a beacon server when the received signal strength is greater than some threshold value (e.g., 10 decibels). If the received signal strength is below the threshold value, the mobile device will not report the received beacon signal or beacon payload.

Figure 4:
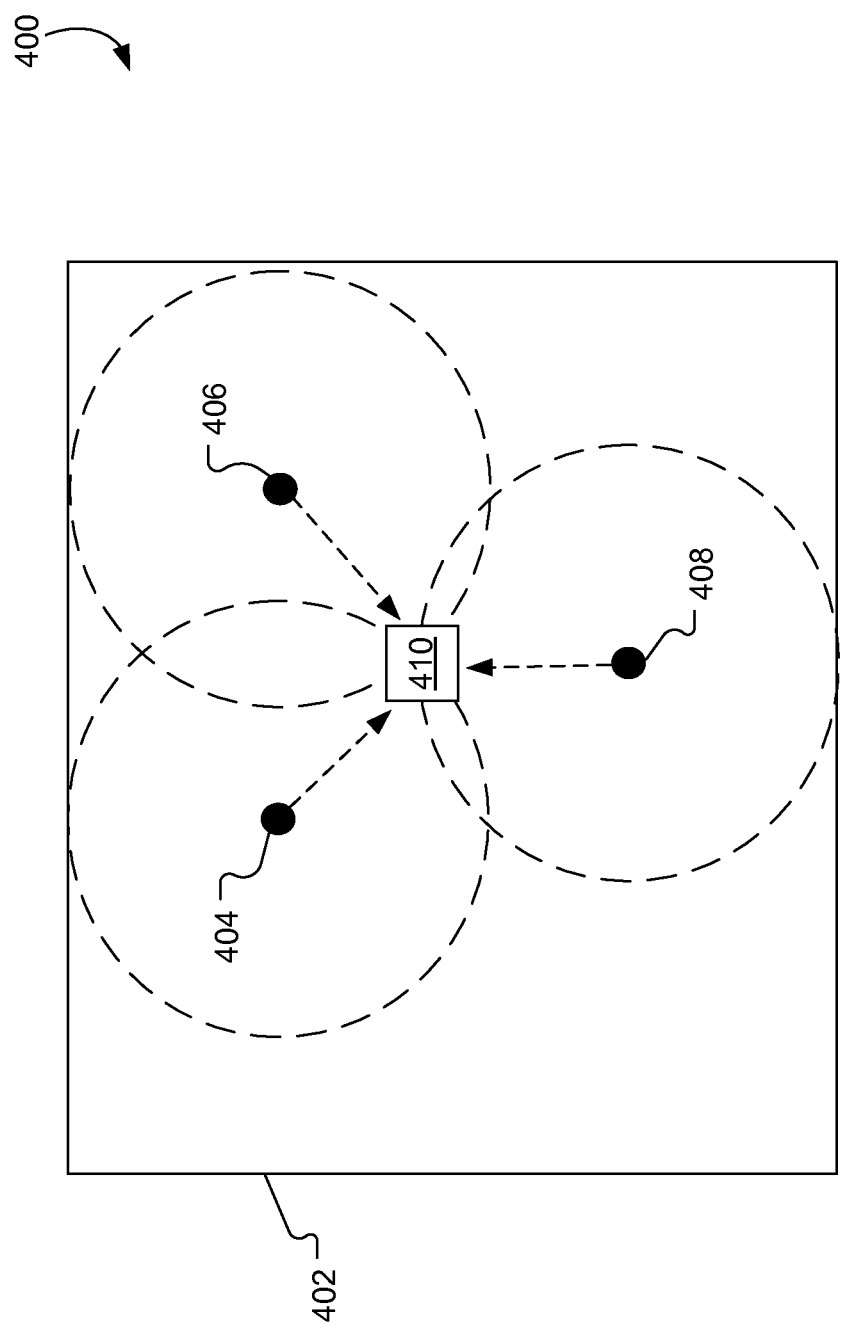
FIG. 4 is a drawing illustrating location estimation using Bluetooth LE beacons.

FIG. 4 is a drawing 400 illustrating location estimation using Bluetooth LE beacons. For example, building 402 can include Bluetooth LE beacon devices 404, 406, and 408 that broadcast beacon payloads that comport with the beacon protocol described herein (e.g., transmit the beacon packet 200 described above).

In some implementations, when mobile device 410 enters building 402, mobile device 410 can receive Bluetooth LE beacon signals from each beacon devices 404-408 that include the beacon packet/payload described above with reference to FIGS. 1 and 2. For example, mobile device 410 can receive company identifier, beacon type, UUID, major, minor and measured power values from each beacon devices 404-408. The mobile device 410 can use the company identifier and the beacon type to determine that the beacon is a beacon that uses a particular beacon protocol provided by a particular vendor (e.g., the beacon is a proximity beacon that uses an Apple Inc. beacon protocol). The mobile device 410 can then use the identified beacon protocol to extract data from the rest of the beacon payload.

For example, the mobile device 410 can extract from the beacon payload the UUID, major and minor values for identifying the sending beacon, the geofence associated with the sending beacon and/or the precise location of the sending beacon. The mobile device 410 can use the measured power value to calibrate the received signal strength distance function (e.g., distance=function(measured power, signal strength)). For example, based on the measured power and signal strength, the mobile device 410 can determine the relative distance between the mobile device and transmitting beacon (e.g., immediate, near, far, unknown). Based on the measured power and signal strength, the mobile device 410 can estimate the actual distance (e.g., feet, meters, inches, centimeters, etc.) between the mobile device 410 and a transmitting beacon device (e.g., beacon devices 404, 406 or 408).

In some implementations, once the mobile device 410 has determined the beacon identification information (e.g., UUID, major and minor values) and the distance information (e.g., relative distance, actual distance), the mobile device 410 can transmit the beacon identification information and distance information for each beacon devices 404-408 to a beacon server. The beacon server can determine the location of each beacon device 404-408 based on the beacon identification information. The beacon server can determine the location of mobile device 410 based on the known location of the beacon devices 404-408 and the distance information using well known trilateration techniques. Once the beacon server has estimated the location of mobile device 410, the beacon server can transmit the estimated location of the mobile device 410 to the mobile device.

In some implementations, the mobile device 410 can merely forward (e.g., retransmit) the beacon payload information and received signal strength to the beacon server and the beacon server can determine beacon locations and distances between the mobile device and the respective beacon devices. In some implementations, the mobile device 410 can be configured with beacon location information and can estimate the location mobile device 410 without sending beacon payload information to the beacon server. For example, the mobile device 410 can perform the distance and trilateration calculations to determine the location of mobile device 410.

Example Processes

Figure 5:
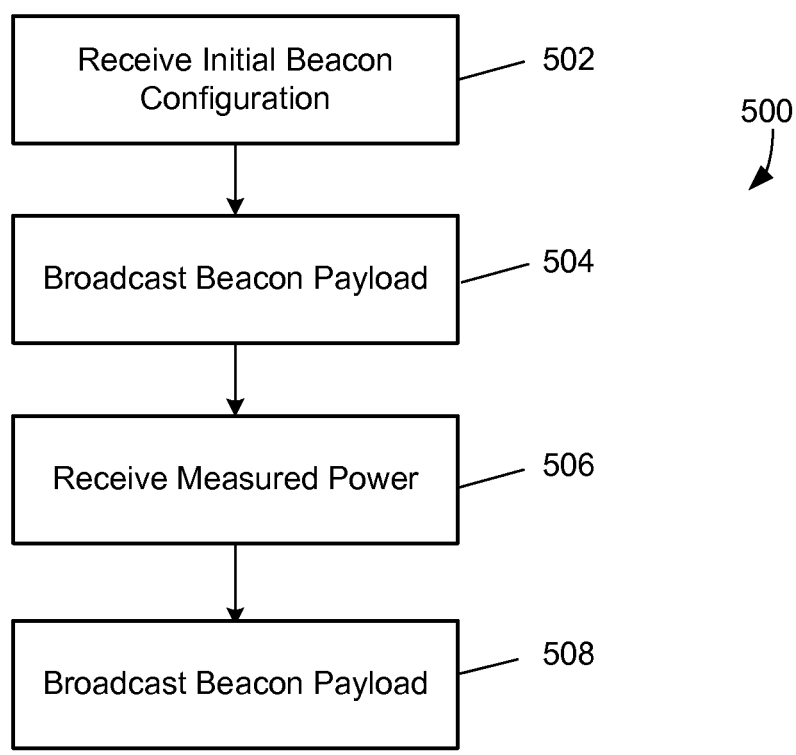
FIG. 5 is a flow diagram of an example process for transmitting a beacon payload from a beacon.

FIG. 5 is a flow diagram of an example process 500 for transmitting a beacon payload from a beacon. For example, the beacon can be a Bluetooth LE beacon that conforms to the Bluetooth 4.0 Core Specification. The beacon can be a smart phone, tablet computer, laptop computer, desktop computer, mobile device or any other device that has a Bluetooth LE wireless transceiver.

At step 502, the beacon device can receive the initial configuration for the beacon. For example, the beacon device can be programmed with the company identifier, beacon type identifier, UUID, major and minor values as described above with reference to FIG. 2. Initially, the beacon device may not be configured with a measured power value as the transmission power of the beacon device has not been measured yet. Alternatively, the beacon device may be configured with a null value or a default value indicating that the beacon transmission power has yet to be measured. The beacon device can be configured to transmit at a user-defined power setting (e.g., 20 decibels) and/or at a user-defined broadcast interval (e.g., every 2 seconds).

At step 504, the beacon device can broadcast the beacon payload according to the power setting and the broadcast interval. For example, the beacon device can transmit the beacon payload including the configured company identifier, beacon type identifier, UUID, major and minor values. The beacon's broadcast signal can be received by a calibration device that will determine a measured power value at a prescribed distance (e.g., 1 meter) from the beacon.

At step 506, the beacon device can receive a measured power value. For example, the power measured by the calibration device can be transmitted to the beacon device so that the beacon can include the measured power value in subsequent beacon payload broadcasts.

At step 508, the beacon device can broadcast the beacon payload including the measured power value.

Figure 6:
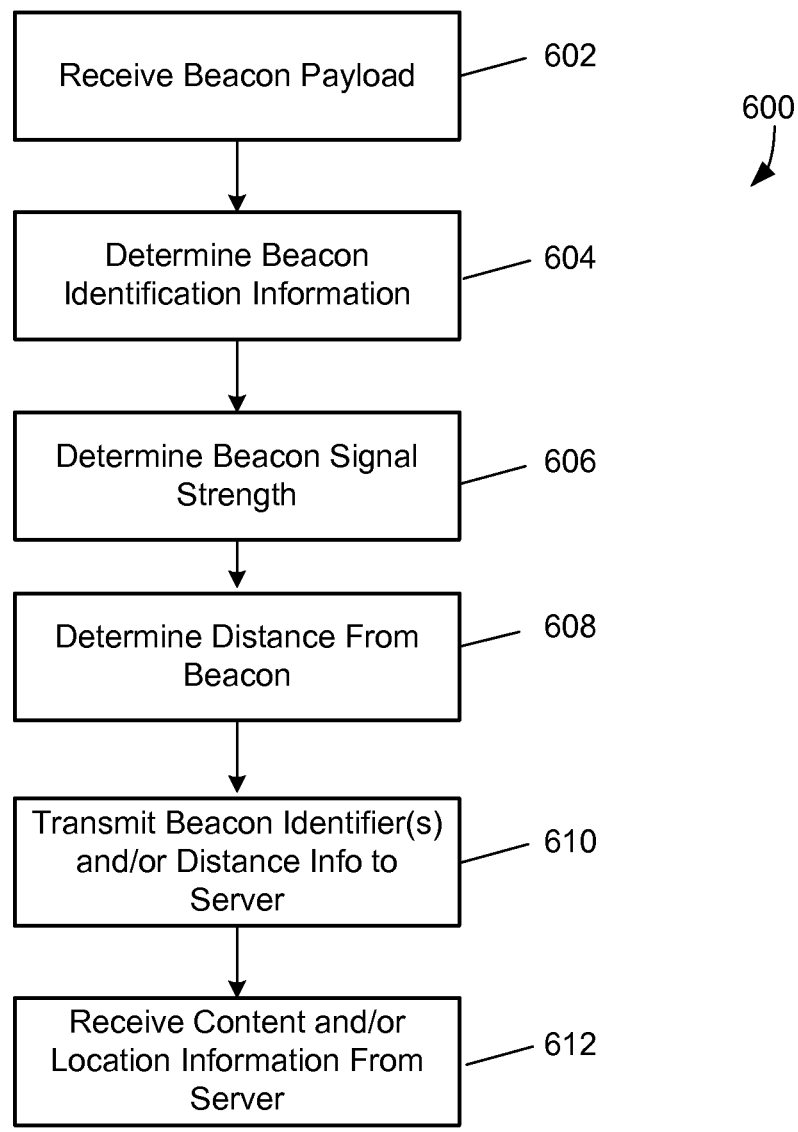
FIG. 6 is a flow diagram of an example process for receiving and utilizing beacon payload information.

FIG. 6 is a flow diagram of an example process 600 for receiving and utilizing beacon payload information. At step 602, a mobile device can receive a beacon payload. For example, the mobile device can be configured to receive Bluetooth LE signals from a Bluetooth LE beacon device that transmits beacon payloads that conform to the beacon protocol described herein. Based on the data in the beacon payload (e.g., company identifier, beacon type), the mobile device can determine that the beacon payload conforms to the beacon protocol described herein.

At step 604, the mobile device can determine the transmitting beacon's identification information. For example, the mobile device can extract from the beacon payload the UUID, major and minor values that identify the broadcasting beacon.

At step 606, the mobile device can determine the received signal strength of the beacon's broadcast signal. For example, the mobile device can measure the received signal strength using well known techniques.

At step 608, the mobile device can determine the distance between the broadcasting beacon and the mobile device. For example, the mobile device can extract the measured power from the beacon payload, use the measured power to calibrate a distance function and determine the distance between the broadcasting beacon and the mobile device by providing the determined received signal strength to the calibrated distance function. The distance function can then return an estimated distance based on the measured power and the received signal strength values.

At step 610, the mobile device can transmit the beacon identifiers and/or the estimated distance to a server. For example, the mobile device can transmit the beacon identifiers and/or estimated distance to a beacon server that is configured with geofence and/or beacon location information. In some implementations, the server can determine that the mobile device has entered a geofence defined by or based on the UUID, major, and/or minor values received from the mobile device. In some implementations, the server can use the beacon identifiers (e.g., UUID, major, minor values) and the distance between the transmitting beacon devices and the mobile device to determine a location of the mobile device. For example, the beacon identifiers can be used by the server to look up the locations of the beacon devices. The locations of the beacon devices and the distances between the beacon devices and the mobile device can be used to determine a location of the mobile device using well known trilateration techniques.

At step 612, the mobile device can receive content and/or location information from the server. In some implementations, if the server has determined that the mobile device has entered a geofence, the server can transmit content (e.g., an advertisement) associated with the geofence to the mobile device. Alternatively, if the server has determined that the mobile device has entered a geofence, the server can trigger an action or operation based on that determination. For example, upon detecting that a mobile device has entered a geofence, a service can be initiated on behalf of the user of the mobile device. For example, if the user has entered a geofence for a store to pick up a package, the server can notify an employee of the store to retrieve the package for the user upon detecting that the user has entered the geofence. Thus, the package will be waiting for the user when the user reaches a service counter to pick up the package.

In some implementations, if the server has estimated a location of the mobile device, the server can transmit the estimated location of the mobile device to the mobile device. The mobile device can then present the location information to the user or use the location information to provide some service to the user.

Figure 7:
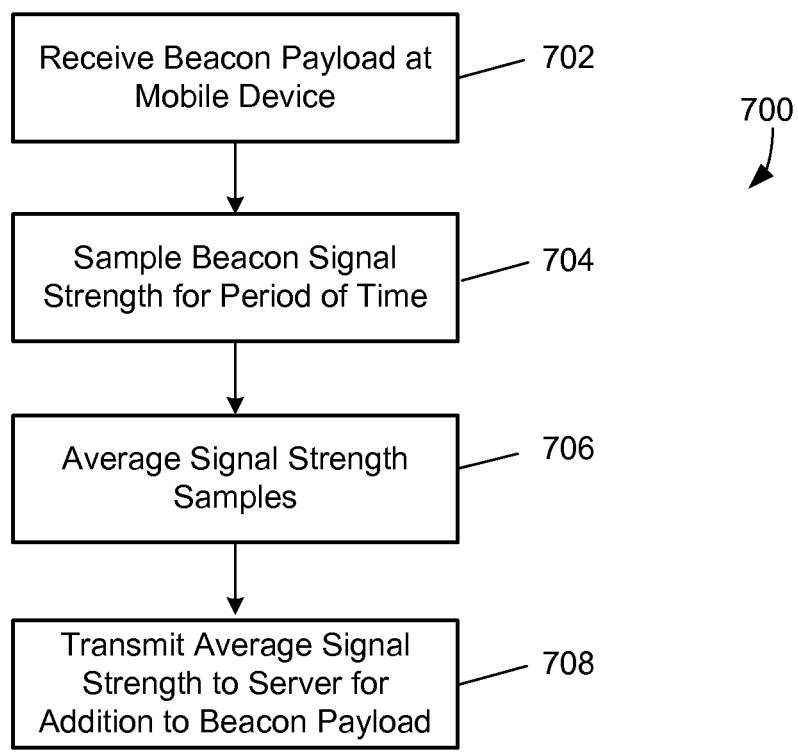
FIG. 7 is a flow diagram of an example process for determining the measured power for a beacon.

FIG. 7 is a flow diagram of an example process 700 for determining the measured power for a beacon device. At step 702, a beacon payload can be received at a mobile device. For example, a user can hold the mobile device so that a Bluetooth LE transceiver of the mobile device has a direct line of sight orientation to the broadcasting beacon.

At step 704, the mobile device can sample the received signal strength of the beacon's broadcast signal for a period of time. For example, the mobile device can sample the received signal strength of the beacon signal over a ten second period while the user of the mobile device moves the mobile device along a path that is one meter distance from the broadcasting beacon device.

At step 706, the mobile device can compute the average of the received signal strength samples. For example, the mobile device can calculate the average of the received signal strength samples after discarding the highest ten percent and the lowest twenty percent of the received signal strength samples.

At step 708, the mobile device can transmit the average signal strength to a beacon server for addition to the beacon payload as the measured power value. For example, the mobile device can transmit the measured power value (e.g., average signal strength) to the beacon server so that the beacon server can configure or program the beacon device with the measured power value.

Example System Architecture

Figure 8:
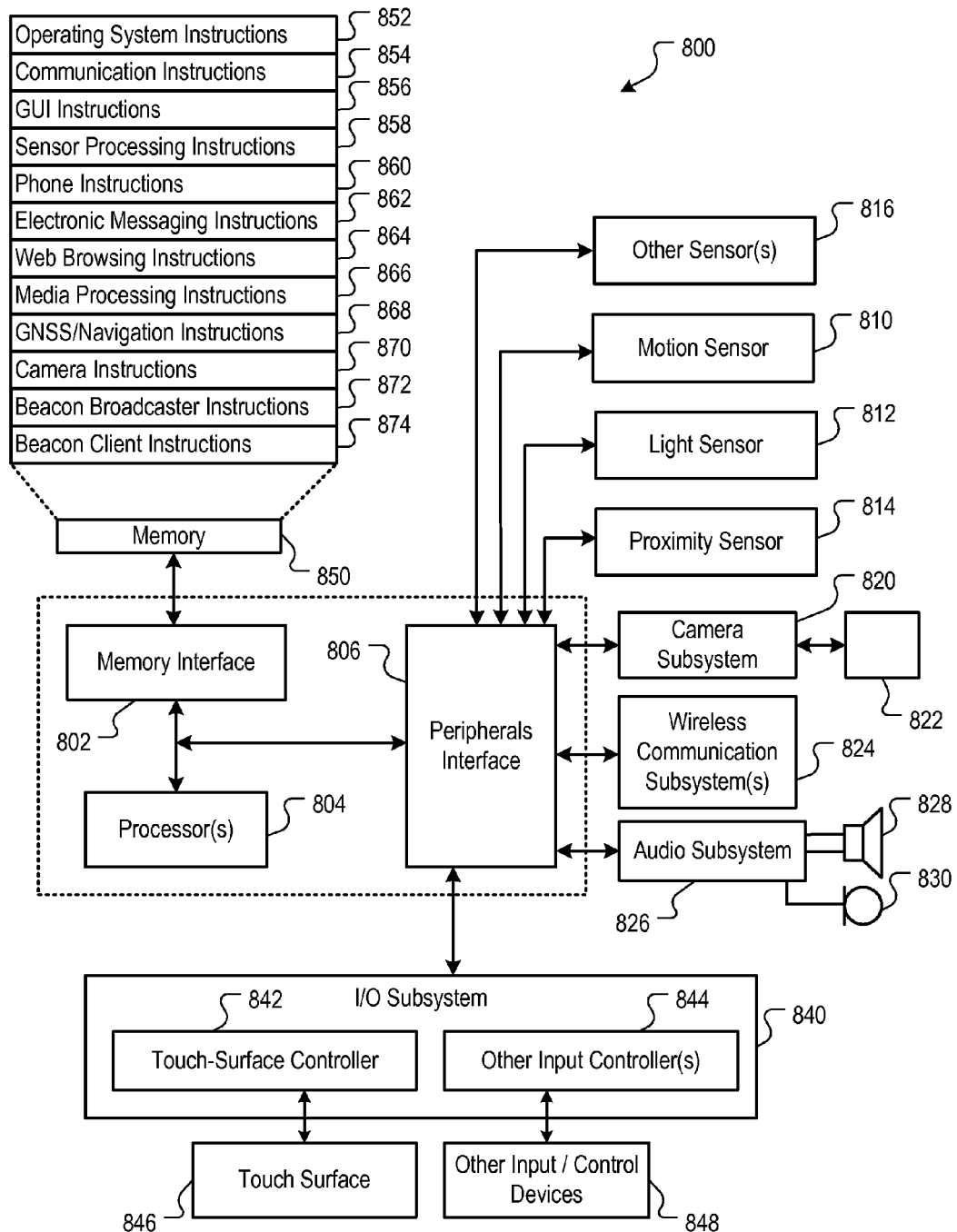
FIG. 8 is a block diagram of an example computing device that can implement the features and processes of FIGS. 1-7.

FIG. 8 is a block diagram of an example computing device 800 that can implement the features and processes of FIGS. 1-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 100 can be configured as a base station for other wireless devices. Communication subsystems 824 can include Bluetooth and/or Bluetooth Low Energy (LE) (Bluetooth 4.0) transceivers. For example, the system 800 can generate and broadcast beacon packages that conform to the protocols described herein using a Bluetooth LE transceiver. System 800 can be configured to receive and process Bluetooth LE beacon packages using a Bluetooth LE wireless transceiver.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voice printing and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™ The computing device 800 can, therefore, include a pin connector that is compatible with the iPod. Other input/output and control devices can also be used.

The memory interface 802 can be coupled to memory 850. The memory 850 can include high-speed random access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing voice authentication. For example, operating system 852 can implement the beacon payload transmitter and/or beacon payload receiver features as described with reference to FIGS. 1-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store other software instructions 872 to facilitate other processes and functions, such as the broadcasting beacon processes and functions as described with reference to FIGS. 1-7. The memory 850 can store other software instructions 874 to facilitate other processes and functions, such as the beacon client (e.g., receiving mobile device) processes and functions as described with reference to FIGS. 1-7.

The memory 850 can also store other software instructions (not shown), such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

What is claimed is:

1. A method comprising:
    broadcasting, from a beacon device a plurality of signals;
    receiving a measured power value calculated based on received signal strengths of the plurality of signals by a calibration device within communication range of the beacon device;
    generating a beacon payload that includes the measured power value, a first set of values for complying with a Bluetooth protocol and a second set of values that comply with a beacon protocol that is different than the Bluetooth protocol, where the second set of values include at least two values that identify, or are associated with, a company; and
    broadcasting, from the beacon device, the beacon payload.

2. The method of claim 1, where the beacon device is programmed by a network server to broadcast at a specified time interval.

3. The method of claim 1, where the beacon device is programmed by a server computer to broadcast at a specified transmission power.

4. A method comprising:
    receiving, at a mobile device, a signal from a beacon device over a Bluetooth communication link, where the signal includes a beacon payload that includes a measured power value, data identifying the beacon device, a first set of values for complying with a Bluetooth protocol and a second set of values that comply with a beacon protocol that is different than the Bluetooth protocol, where the second set of values include at least two values that identify, or are associated with, a company;
    extracting from the beacon payload the measured power value, the second set of values and the data identifying the beacon device;
    determining the received signal strength of the signal;
    determining a distance between the mobile device and the beacon device based on the measured power value and the received signal strength; and
    sending, by the mobile device to a server computer over a communication link that is different than the Bluetooth communication link, the distance, the second set of values and the data identifying the beacon device; and
    receiving, by the mobile device over the communication network, content associated with the distance, the second set of values and the data.

5. The method of claim 4, where determining a distance between the mobile device and the beacon device includes calibrating a distance function using the measured power value.

6. The method of claim 5, where the distance function is based on a path loss model that uses an exponential decay curve that is calibrated based on the measured power value.

7. The method of claim 4, further comprising:
    extracting from the beacon payload information identifying a particular the beacon protocol; and
    extracting data from the beacon payload according to the beacon protocol.

8. The method of claim 7, where the the second set of values include values for identifying a location of the beacon device.

9. The method of claim 7, further comprising:
    receiving, from the server computer, a location of the mobile device.

10. A beacon device comprising:
    one or more processors configured to generate a beacon payload that includes a measured power value, a first set of values for complying with a Bluetooth protocol and a second set of values that comply with a beacon protocol that is different than the Bluetooth protocol, where the second set of values include at least two values that identify, or are associated with, a company; and
    a wireless transceiver coupled to the one or more processors and configured to:
        receive the measured power value from a calibration device; and
        broadcast the beacon payload to receiving devices.

11. The beacon device of claim 10, where the beacon device is programmed by a network server to broadcast at a specified time interval.

12. The beacon device of claim 10, where the beacon device is programmed by a network server to broadcast at a specified transmission power.

13. A mobile device comprising:
    a wireless transceiver configured to receive a signal from a beacon device over a Bluetooth communication link, where the signal includes a beacon payload that includes a measured power value, data identifying the beacon device, a first set of values for complying with a Bluetooth protocol and a second set of values that comply with a beacon protocol that is different than the Bluetooth protocol, where the second set of values include at least two values that identify, or are associated with, a company; and
    one or more processors coupled to the wireless transceiver and configured to:
        extract from the beacon payload the measured power value, the second set of values and the data identifying the beacon device;
        determine the received signal strength of the signal; and
        determine a distance between the mobile device and the beacon device based on the measured power value and the received signal strength;
        sending, by the mobile device to a server computer over a communication link that is different than the Bluetooth communication link, the distance, the second set of values and the data identifying the beacon device; and
        receiving, by the mobile device over the communication network, content associated with the distance, the second set of values and the data.

14. The mobile device of claim 13, where determining a distance between the mobile device and the beacon device includes calibrating a distance function using the measured power value.

15. The mobile device of claim 14, where the distance function is based on a path loss model that uses an exponential decay curve that is calibrated based on the measured power value.

16. The mobile device of claim 13, wherein
the one or more processors are further configured to extract from the beacon payload information identifying the beacon protocol; and extract data from the beacon payload according to the beacon protocol.

17. The mobile device of claim 16, where the second set of values include a values for identifying a location of the beacon device.

18. The mobile device of claim 16, further comprising:
receiving, from the server computer, a location of the mobile device.

* * * * *